US012608044B2

(12) United States Patent
Gillett et al.

(10) Patent No.: US 12,608,044 B2
(45) Date of Patent: Apr. 21, 2026

(54) DEVICE CASE WITH INTEGRATED KICKSTAND AND DOCKING COMPATIBILITY

(71) Applicant: Google LLC, Mountain View, CA (US)

(72) Inventors: Nicholas Gillett, San Francisco, CA (US); Bengt Brummer, San Francisco, CA (US); Eugene Fox, San Francisco, CA (US); Carl Cepress, Sunnyvale, CA (US); Maj Isabelle Olsson, Sunnyvale, CA (US); Nicholas Sanders, Saratoga, CA (US); Jose Madrid, Mountain View, CA (US)

(73) Assignee: Google LLC, Mountain View, CA (US)

( * ) Notice: Subject to any disclaimer, the term of this patent is extended or adjusted under 35 U.S.C. 154(b) by 39 days.

(21) Appl. No.: 18/418,898

(22) Filed: Jan. 22, 2024

(65) Prior Publication Data

US 2024/0248516 A1    Jul. 25, 2024

Related U.S. Application Data

(60) Provisional application No. 63/440,743, filed on Jan. 24, 2023.

(51) Int. Cl.
*G06F 1/16* (2006.01)
*H01F 7/02* (2006.01)

(52) U.S. Cl.
CPC ............ *G06F 1/1632* (2013.01); *G06F 1/166* (2013.01); *H01F 7/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,783,458 | B2 * | 7/2014 | Gallagher | ............ F16M 13/005 |
| | | | | 206/320 |
| 9,170,611 | B2 * | 10/2015 | Gallagher | ............ G06F 1/1633 |
| 9,307,656 | B2 * | 4/2016 | Murchison | ............ G06F 1/1626 |
| 9,795,213 | B1 * | 10/2017 | Vier | ...................... G06F 1/1626 |
| 10,078,346 | B2 * | 9/2018 | Lay | ........................ F16M 11/38 |
| D832,271 | S * | 10/2018 | Cheng | .......................... D14/440 |
| 10,139,861 | B2 * | 11/2018 | Gallagher | ............ H05K 5/0226 |
| 10,303,212 | B2 * | 5/2019 | Wang | ................... G06F 1/1683 |
| 10,372,169 | B1 * | 8/2019 | Ferren | .................. G06F 1/1628 |
| 10,400,940 | B2 * | 9/2019 | Vier | ...................... G06F 3/0208 |
| 10,495,254 | B2 * | 12/2019 | Torres | ................. F16M 11/10 |
| 11,009,918 | B2 * | 5/2021 | Oakeson | ................ G06F 3/0202 |
| 11,586,254 | B2 * | 2/2023 | Tsai | ...................... G06F 1/1679 |
| 11,977,412 | B2 * | 5/2024 | Miles | ..................... F16M 11/22 |
| 12,210,377 | B2 * | 1/2025 | Lim | ...................... G06F 1/1681 |

(Continued)

*Primary Examiner* — Lisa Lea-Edmonds
(74) *Attorney, Agent, or Firm* — Lerner David LLP

(57) ABSTRACT

Various arrangements of an electronic device case are presented herein. The case can include a housing shaped to allow an electronic device to be removably installed within the housing. The case can include magnets, the magnets being arranged to magnetically couple with magnets of a dock. The case can include a kickstand assembly attached with the housing. A kickstand body of the kickstand assembly can be extended for propping up the electronic device case when the electronic device case is not docked with the dock. The kickstand body can be collapsed for when the electronic device case is magnetically docked with the dock.

20 Claims, 11 Drawing Sheets

(56) References Cited

U.S. PATENT DOCUMENTS

| | | | |
|---|---|---|---|
| 12,265,429 B2 * | 4/2025 | Perelli .................. | G06F 1/1641 |
| 2012/0211377 A1 * | 8/2012 | Sajid ..................... | G06F 1/1628 |
| | | | 206/216 |
| 2013/0016467 A1 * | 1/2013 | Ku ......................... | F16M 11/10 |
| | | | 361/679.08 |
| 2013/0020215 A1 * | 1/2013 | Hsu ....................... | F16M 11/10 |
| | | | 206/320 |
| 2013/0277530 A1 * | 10/2013 | Wong .................. | F16M 11/041 |
| | | | 248/688 |
| 2019/0243419 A1 * | 8/2019 | Charlesworth ........ | H04B 1/385 |
| 2024/0248516 A1 * | 7/2024 | Gillett .................. | G06F 1/1632 |
| 2025/0284317 A1 * | 9/2025 | Gallagher ............ | H05K 5/0226 |

* cited by examiner

100

130

110

120

210

610

620

Installing a device within a case having an integrated kickstand                                 1010

Supporting the device at an angle using the kickstand                                 1020

Collapsing the kickstand                                 1030

Coupling the case with a dock via one or more magnets within a region of the case encircled by the kickstand                    1040

DEVICE CASE WITH INTEGRATED KICKSTAND AND DOCKING COMPATIBILITY

CROSS-REFERENCE TO RELATED APPLICATION

This application claims the benefit of, and priority to U.S. Provisional Application Ser. No. 63/440,743, filed Jan. 24, 2023, entitled "Device Case with Integrated Kickstand and Docking Compatibility", which is hereby incorporated by reference in its entirety for all purposes.

BACKGROUND

Installing a protective case on a device, such as a smartphone or tablet computer, can help protect the device in case of falls, drops, impacts, spills, and contact with abrasive materials. However, cases can interfere with functionality of the device. For example, if the device is to be docked with a base, the case might prevent such docking.

SUMMARY

Various embodiments are described related to an electronic device case. In some embodiments, an electronic device case is described. The device may comprise a housing shaped to allow an electronic device to be removably installed within the housing. The device may comprise a first plurality of magnets housed by the housing, the first plurality of magnets arranged to magnetically couple with a second plurality of magnets of a dock. The device may comprise a kickstand assembly attached with the housing. A kickstand body of the kickstand assembly may be extendable for propping up the electronic device case when the electronic device case is not docked with the dock and the kickstand body may be collapsible to rest against a rear surface of the housing for when the electronic device case is magnetically docked, via the first plurality of magnets, with the dock.

Embodiments of such a method may include one or more of the following features: the kickstand assembly, when the kickstand body is collapsed against the rear surface, may encircle the first plurality of magnets housed by the housing. The kickstand assembly may be ring-shaped. The kickstand assembly may be an elongated fully encircling ring-shaped kickstand. The device may comprise a plurality of electrical contacts, housed by the housing, that may be arranged to transfer electrical signals between the dock and the electronic device, when installed in the electronic device case, when the electronic device case may be magnetically docked with the dock. The plurality of electrical contacts may comprise one or more pogo pins. The housing may be formed from an inner housing and an outer housing, the inner housing and the outer housing being made of different materials. The first plurality of magnets may be further configured to magnetically couple with a third plurality of magnets of the electronic device while magnetically coupled with the second plurality of magnets of the dock. An inner surface of the housing may be covered in microfiber. A retention magnet may be housed by the kickstand body to retain the kickstand body against the rear surface of the housing when the kickstand body is collapsed. The kickstand body may be formed using non-ferromagnetic stainless steel.

In some embodiments, a tablet computer system is described. The system may comprise a tablet computer. The system may comprise a dock for the tablet computer from which the tablet computer can be removably docked. The system may comprise a case for the tablet computer. The case may comprise a housing shaped to allow the tablet computer to be removably installed within the housing. The case may comprise a first plurality of magnets housed by the housing, the first plurality of magnets arranged to magnetically couple with a second plurality of magnets of the dock. The case may comprise a kickstand assembly attached with the housing. A kickstand body of the kickstand assembly may be extendable for propping up the case when the case is not docked with the dock and the kickstand body may be collapsible to rest against a rear surface of the housing for when the case is magnetically docked, via the first plurality of magnets, with the dock.

Embodiments of such a method may include one or more of the following features: the kickstand assembly, when the kickstand body is collapsed against the rear surface of the case, may encircle the first plurality of magnets housed by the housing. The kickstand assembly may be ring-shaped. The kickstand assembly may be an elongated fully encircling ring-shaped kickstand. The system may further comprise a plurality of electrical contacts, housed by the housing, that may be arranged to transfer electrical signals between the dock and the tablet computer, when installed in the case, when the case is magnetically docked with the dock. The plurality of electrical contacts may comprise one or more pogo pins. The housing may be formed from an inner housing and an outer housing, the inner housing and the outer housing being made of different materials. The first plurality of magnets may be further configured to magnetically couple with a third plurality of magnets of the tablet computer while magnetically coupled with the second plurality of magnets of the dock. A retention magnet may be housed by the kickstand body to retain the kickstand body against the rear surface of the housing when the kickstand body is collapsed.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments of a case are presented herein that allow for a kickstand of the case to be extended to allow a device housed by the case to be supported (or "propped up") and also allow for the device to be magnetically docked with a dock while remaining installed in the case. The case may have a kickstand that can be extended or collapsed to a desired angle for supporting the case (and installed device). When not in use, the kickstand can be collapsed against a rear surface of the case. When the kickstand is in this position, the case and installed device can be magnetically attached with a dock.

When the device is mounted directly to the dock, a group of magnets present within the device can magnetically couple with magnets present in the dock. The magnets can function to not only hold the device in position on the dock, but also cause multiple contact pads of the device to align with contact pins of the base. The case can also have magnets. The magnets of the case magnetically couple with the magnets present within the device and within the dock. Thus, the magnets of the case also function to hold the device in position on the dock and also cause multiple contact pads of the case to align with the contact pins of the base. Due to the positioning of the kickstand, there is no physical interference with the magnetic coupling of the case with the dock. The contact pads of the case allow for electrical signals, which can include data, power, or both, to be exchanged between the dock and device.

The embodiments detailed herein are focused on a case having dimensions to house a tablet computer, which is a form of electronic device. Specifically, a tablet computer can serve as a home assistant device and/or hub to manage smart home devices in an environment. The tablet computer may be able to record video, communicate with a remote server system, and interact with users via spoken communications. The tablet computer may be left docked with a dock to charge its battery and use other features of the dock, such as an integrated speaker. The tablet computer may be removed from the dock for convenience to be used or displayed at another location. When not in use (whether docked, not docked, or both), photos or photo albums selected by a user may be presented by the tablet. Other embodiments of the cases detailed herein can be applied to other forms of electronic devices. Many other types of electronic devices can benefit from a case that has a kickstand and also has the ability to be docked without removing the case. For example, smartphones, gaming devices, e-readers, personal digital assistants (PDAs), digital paper tablets, and smart picture frames may benefit from various embodiments of a case as detailed herein.

Figure 1:
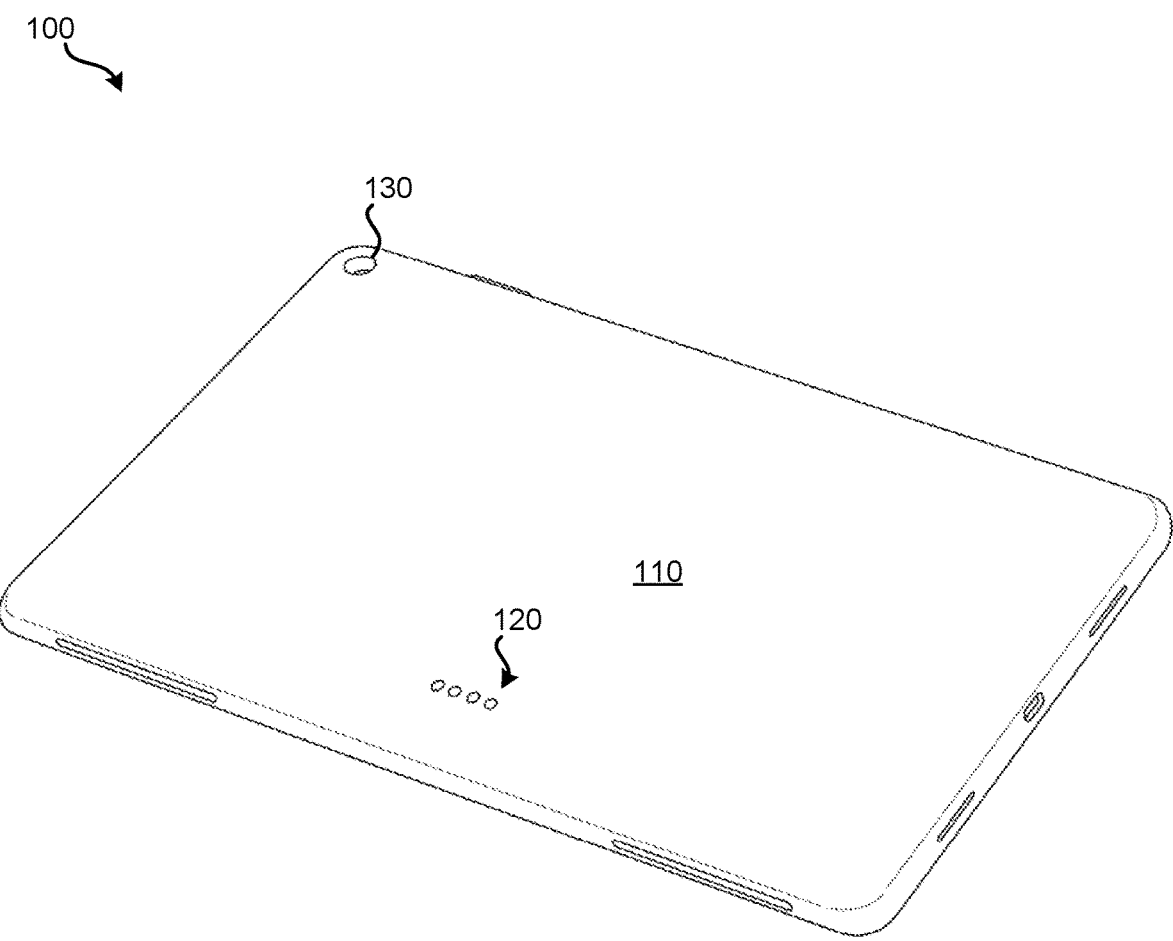
FIG. 1 illustrates an embodiment of a device that can be docked with a docking station or "dock" using magnets.

Further detail is provided in reference to the figures. FIG. 1 illustrates an embodiment of a device 100 that is configured to dock with a dock using magnets and contact pads. Device 100 can be a tablet computer or, more specifically, a tablet computer that serves as a home assistant device or hub as previously detailed. One or more magnets may be hidden within device 100 behind rear surface 110. In other embodiments, the magnets may be exposed on rear surface 110. Device 100 includes multiple conductive contact pads 120 (e.g., metallic pads) that are used to transfer data with and/or obtain power from a dock from docked. As illustrated, four contact pads 120 are present. In other embodiments, a greater or fewer number of contact pads 120 may be present. The arrangement of contact pads 120 can also vary by embodiment. In other embodiments, rather than using contact pads, some other form of electrical contact may be used, such as pins or a combination of pads and pins. Other components, such as camera 130, may be present on or accessible through rear surface 110.

Figure 2:
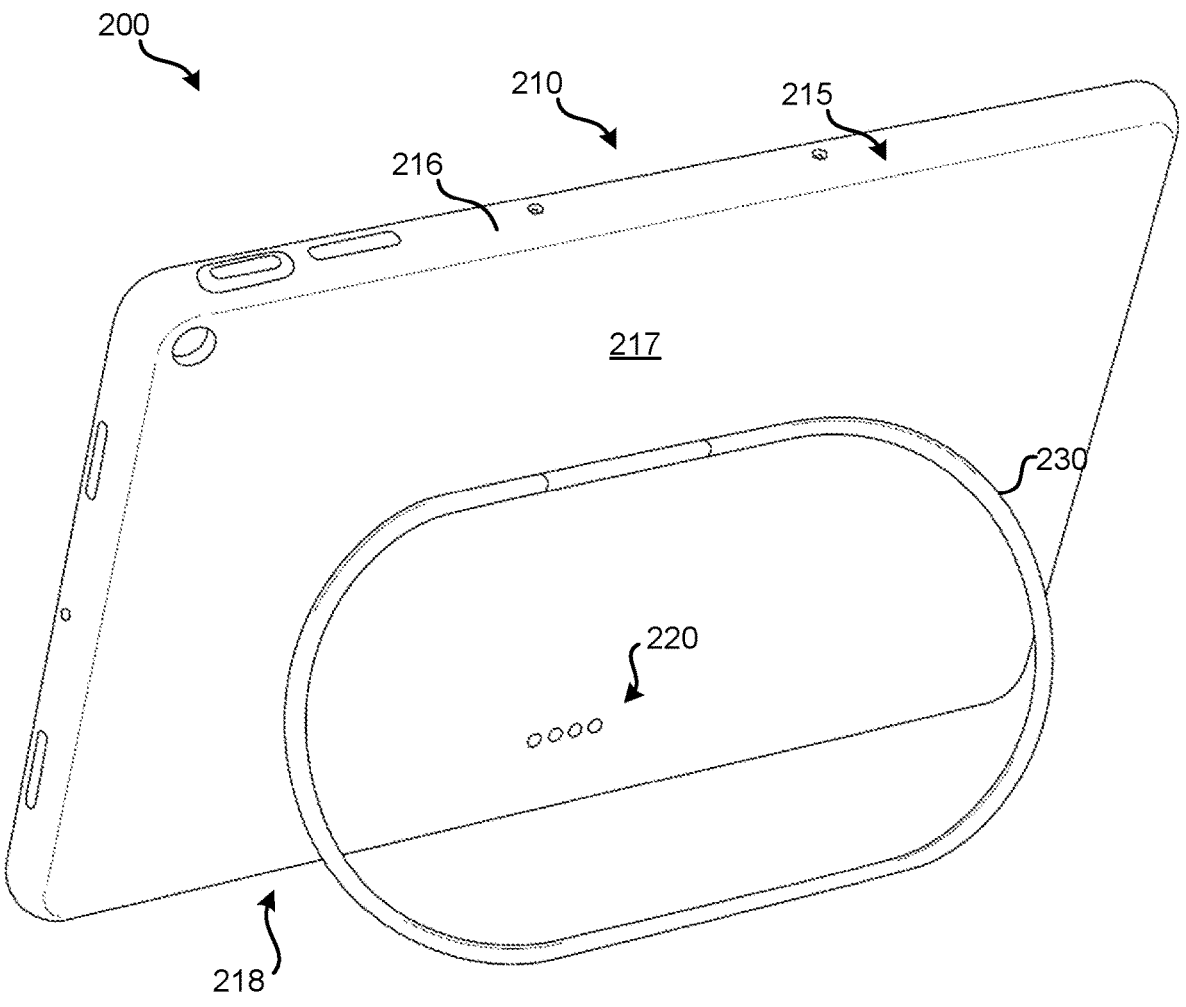
FIG. 2 illustrates an embodiment of a device that is installed in a case and is supported at an angle by the case's kickstand.

FIG. 2 illustrates an embodiment of system 200 that includes device 100 (not visible) installed in case 210 and is supported at an angle by kickstand assembly 230. As shown in FIG. 2, case 210 has several components visible: housing 215; contact pads 220; and kickstand assembly 230. In general, housing 215 can be formed from a semi-rigid material that allows housing 215 to be flexed and for device 100 to be installed. Housing 215 may include polycarbonate (PC) or some other form of plastic. It is possible that other forms of materials can be used or incorporated as part of housing 215. Further detail regarding housing 215 is provided in relation to FIG. 9.

Present on rear surface 217 of housing 215 may be contact pads 220. Contact pads 220 have the same number, size, and relative location as contact pads 120 of device 100. Therefore, when docked, a dock can connect with case 210 at the same general location and manner as if device 100 was being docked without case 210 being present. Contact pads 220 effectively serve as pass-through electrical connections that transfer electrical signals to and from contact pads 120 of device 100. Each of contact pads 220 can have a corresponding contact pin which firmly makes contact with the corresponding contact pad of contact pads 120 when case 210 is installed on device 100. Further detail regarding contact pads 220 is provided in relation to FIG. 9.

Kickstand assembly 230 can be a ring-shaped kickstand. A kickstand refers to an extendable and collapsible physical arrangement that allows case 210 (and a device, if installed in case 210) to be propped up at an angle, such that case 210 rests on an edge of kickstand assembly 230 and edge 218 of case 210. Kickstand assembly 230 being ring-shaped refers to kickstand assembly 230 being an encircling arrangement. In the embodiment of FIG. 2, when collapsed, kickstand assembly 230 encircles a region of rear surface 217. In other embodiments, kickstand assembly 230 may be a partial ring-shaped kickstand, meaning kickstand assembly 230 forms only a partially encircling arrangement. Other shapes for kickstand assembly 230 are also possible, such as an "L" shape, "U" shape, circular ring, etc. Specifically, in the embodiment of FIG. 2, kickstand assembly 230 is an elongated fully encircling ring-shaped kickstand. Kickstand assembly 230 can be similarly shaped to a perimeter of mating surface of the dock, but with a larger perimeter, thus allowing the mating surface of the dock to fit inside kickstand assembly 230.

Within defined physical limits, a user may extend and collapse kickstand assembly 230 to a desired position. The amount kickstand assembly 230 is extended sets the angle at which case 210 and device 100 will rest. When fully collapsed, kickstand assembly 230 may rest flush with rear surface 217 of case 210. Kickstand assembly 230 can be fully collapsed to allow device 100 to be docked with a dock while remaining installed within case 210.

Kickstand assembly 230 can be formed from a rigid or semi-rigid material, such as metal or plastic. For embodiments of case 210 that include internal magnets, as detailed in relation to FIG. 8, kickstand assembly 230 can benefit from being generally non-magnetic (with the possible exception of a portion of kickstand assembly 230 used for retention, as detailed in relation to FIG. 9). In some embodiments, the body of kickstand assembly 230 is formed from non-ferromagnetic stainless steel. Specifically, stainless steel grades 304 or 316 may be used, or, more generally, some form of austenitic stainless steel may be used. Other metals or materials are also possible, including plastic, wood, aluminum, other metals that are non-magnetic, etc. In still other embodiments, kickstand assembly 230 may be made from a magnetic metal.

Figure 3:
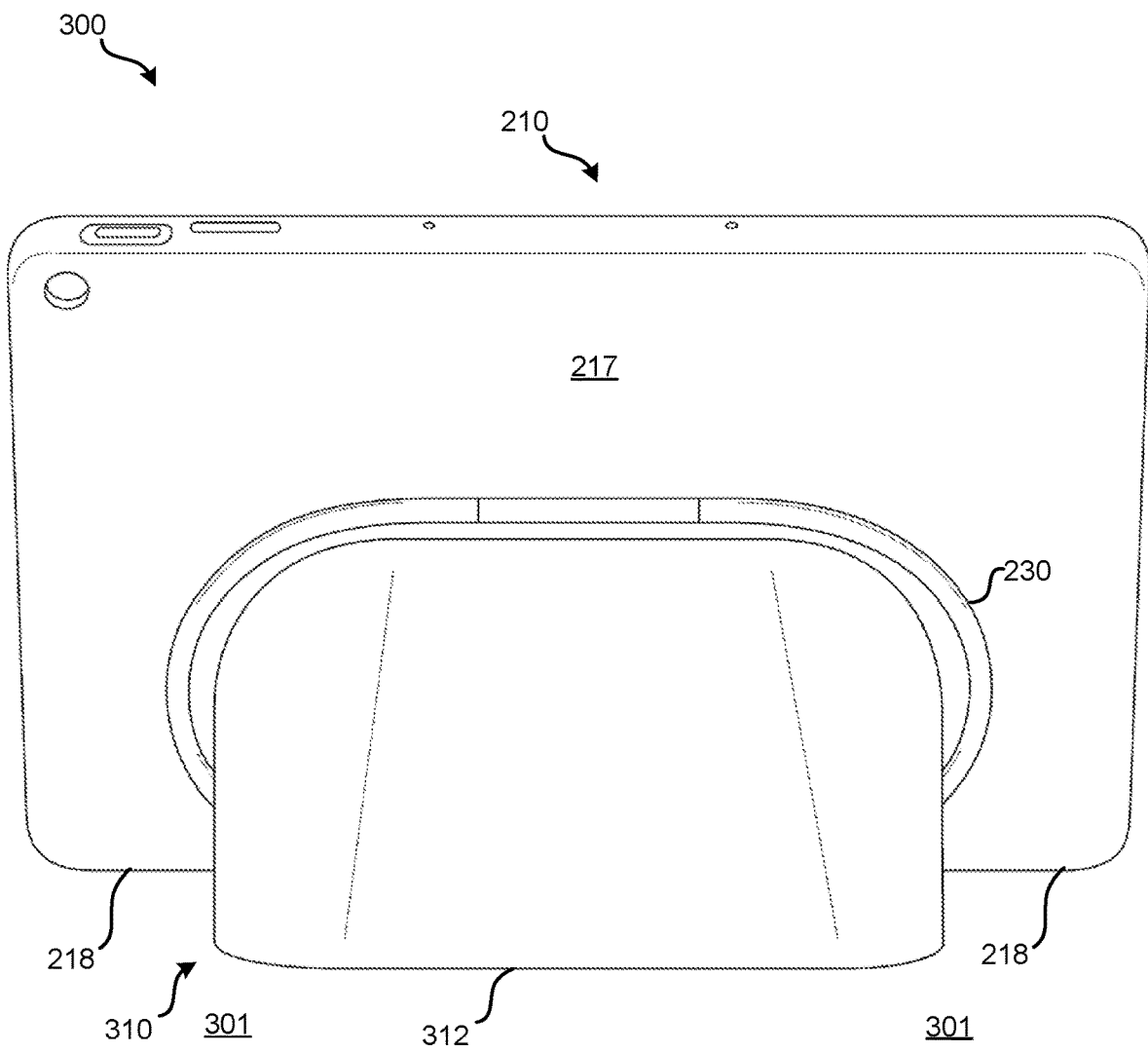
FIG. 3 illustrates a rear view of an embodiment of a device that is installed in a case and is magnetically docked with a dock.

FIG. 3 illustrates a rear view of an embodiment of a system 300 that includes device 100 installed in case 210 and docked with dock 310. Kickstand assembly 230 is fully collapsed against rear surface 217. Dock 310 connects with case 210 via one or more magnets of dock 310 that magnetically connect corresponding magnets of case 210. When coupled, case 210 (and, installed device 100, if present) can be suspended off of surface 301, upon which base 312 of dock 310 rests. Accordingly, edge 218 may not touch surface 301 when case 210 is docked with dock 310.

Dock 310 magnetically couples with case 210 within the region of rear surface 217 encircled by kickstand assembly 230. Therefore, kickstand assembly 230 can fully encircle the region on rear surface 217 where case 210 and a mating surface of dock 310 make contact. In other embodiments, kickstand assembly 230 partially encircles the region on rear surface 217 where case 210 and the mating surface of dock 310 may contact. Since the connection is magnetic, a user may pull case 210 away from dock 310 to remove. To mate, the user may move case 210 close to dock 310. Once close, the magnets of case 210 and magnets of dock 310 help guide case 210 into the proper alignment on dock 310. When docked, contact pads 220 make contact with corresponding pins (or another form of electrical contact) present on the mating surface of dock 310.

Kickstand assembly 230 may be shaped to mirror the shape of the mating region of dock 310. Therefore, as illustrated in FIG. 3, an outer shape of the mating region of dock 310 matches the shape of kickstand assembly 230 but with a smaller perimeter. In other embodiments, such as detailed in relation to FIG. 5, the shape of kickstand assembly 230 does not correspond to the outer shape of the mating region of the dock.

In some embodiments, one or more electromagnets may be present within dock 310 that can be engaged or disengaged. When engaged, such magnets may prevent case 210 from being easily removed by a user from dock 310. When disengaged, it may be relatively easy (compared to when engaged) for the user to remove case 210 from dock 310.

Figure 4:
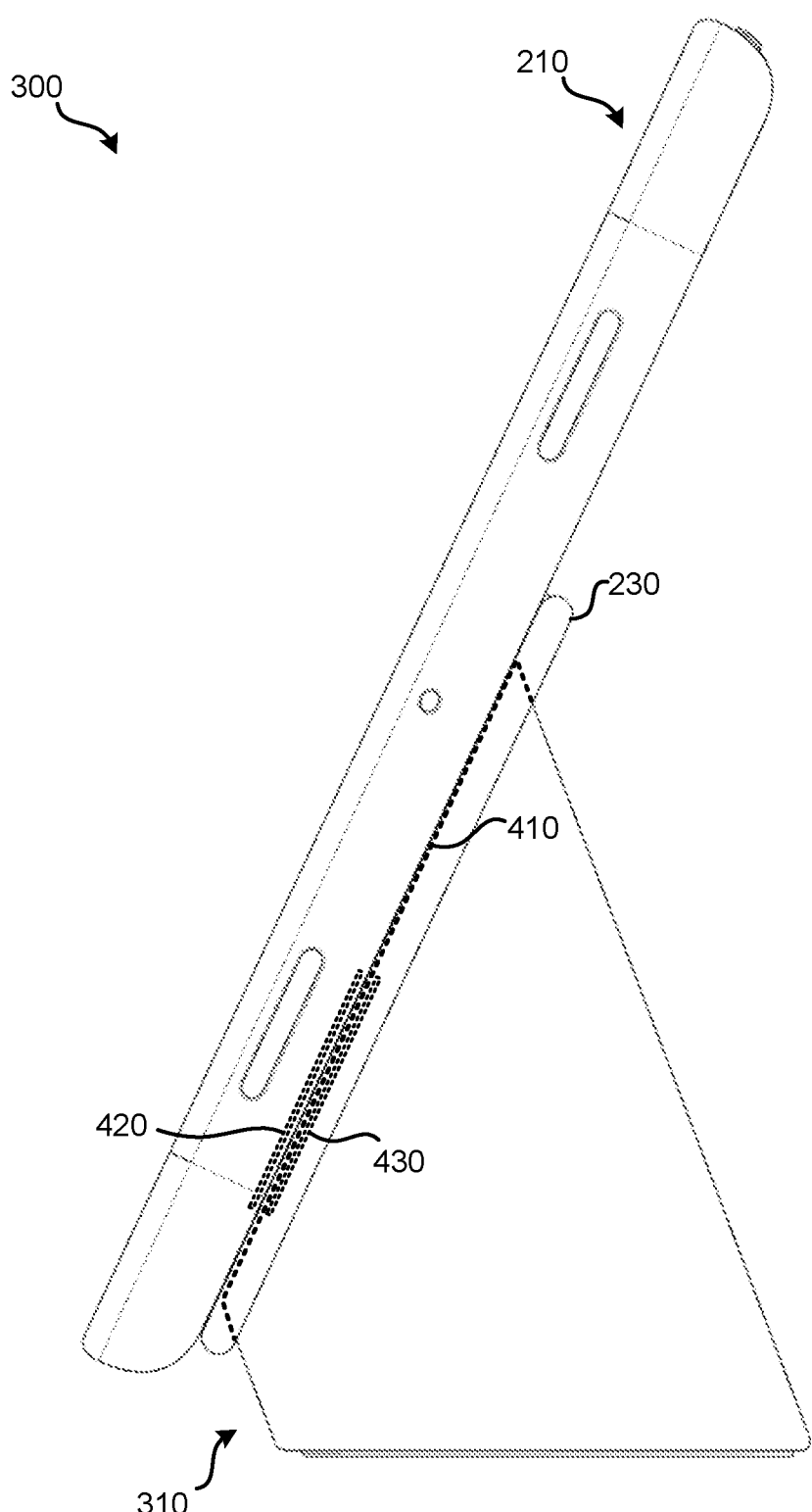
FIG. 4 illustrates a side view of an embodiment of a device that is installed in a case and is magnetically docked with a dock.

FIG. 4 illustrates a side view of an embodiment of case 210. As can be seen from the side view, kickstand assembly 230 is collapsed and rests against rear surface 217 of housing 215 while case 210 is docked with dock 310. Mating surface 410 of dock 310, where rear surface 217 of housing 215 contacts dock 310, is obscured from view by kickstand assembly 230 (and is therefore represented using a broken line).

In other embodiments, rather than kickstand assembly 230 resting against rear surface 217, kickstand assembly 230 may be collapsed to within or partially recessed within case 210.

Within region 420, some number of magnets are present within case 210. In corresponding locations within region 430, some number of magnets (e.g., between 1 and 20 or even more) are present within dock 310. The magnets are arranged such that, when brought into proximity, the magnets of case 210 attract to the magnets of dock 310 to help correctly position dock 310 against case 210 and hold case 210 in a correct position on dock 310.

Figure 5:
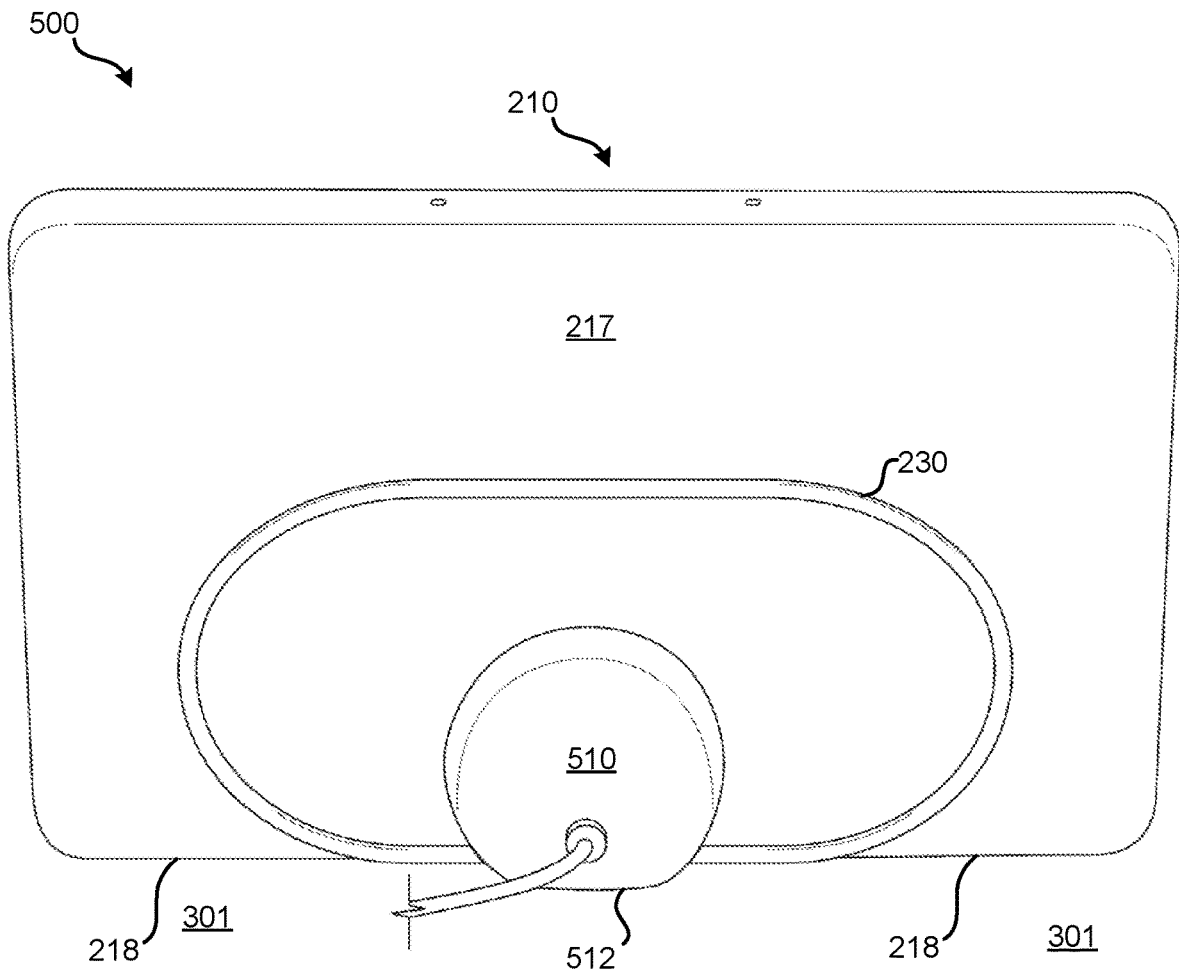
FIG. 5 illustrates a rear view of an embodiment of a device that is installed in a case and is magnetically docked with another type of dock.

FIG. 5 illustrates a rear view of an embodiment of system 500 that includes device 100 installed in case 210 and docked with dock 510. System 500 includes dock 510 which magnetically couples with rear surface 217 differently than system 300. Again here, kickstand assembly 230 is fully collapsed against rear surface 217. Dock 510 connects with case 210 via one or more magnets of dock 510 that magnetically connect corresponding magnets of case 210. Notably, dock 510 may magnetically couple with a subset of the magnets present in case 210, which dock 310 may magnetically couple with all (or at least a greater number) of the magnets present in case 210. In system 500, when dock 510 and case 210 are magnetically coupled, case 210 and base 512 of dock 510 can rest against surface 301 along edge 218.

Similar to dock 310, dock 510 magnetically couples with case 210 within the region of rear surface 217 encircled by kickstand assembly 230. Therefore, kickstand assembly 230 can fully encircle the region on rear surface 217 where case 210 and a mating surface of dock 510 make contact. In other embodiments, kickstand assembly 230 partially encircles the region on rear surface 217 where case 210 and the mating surface of dock 510 may contact. Since the connection is magnetic, a user may pull case 210 away from dock 510 to remove. To mate, the user may move case 210 close to dock 510. Once close, at least some of the magnets of case 210 and magnets of dock 510 help guide case 210 into the proper alignment with dock 510. When docked, contact pads 220 make contact with corresponding pins (or another form of electrical contact) present on the mating surface of dock 510. Through such pins and pads, power may be provided to device 100 and, possibly, data may be transferred.

In this embodiment, kickstand assembly 230 is not shaped to mirror the shape of the mating region of dock 510. In some embodiments, one or more electromagnets may be present within dock 510 that can be engaged or disengaged. When engaged, such magnets may prevent case 210 from being easily removed by a user from dock 510. When disengaged, it may be relatively easy (compared to when engaged) for the user to remove case 210 from dock 510.

Figure 6:
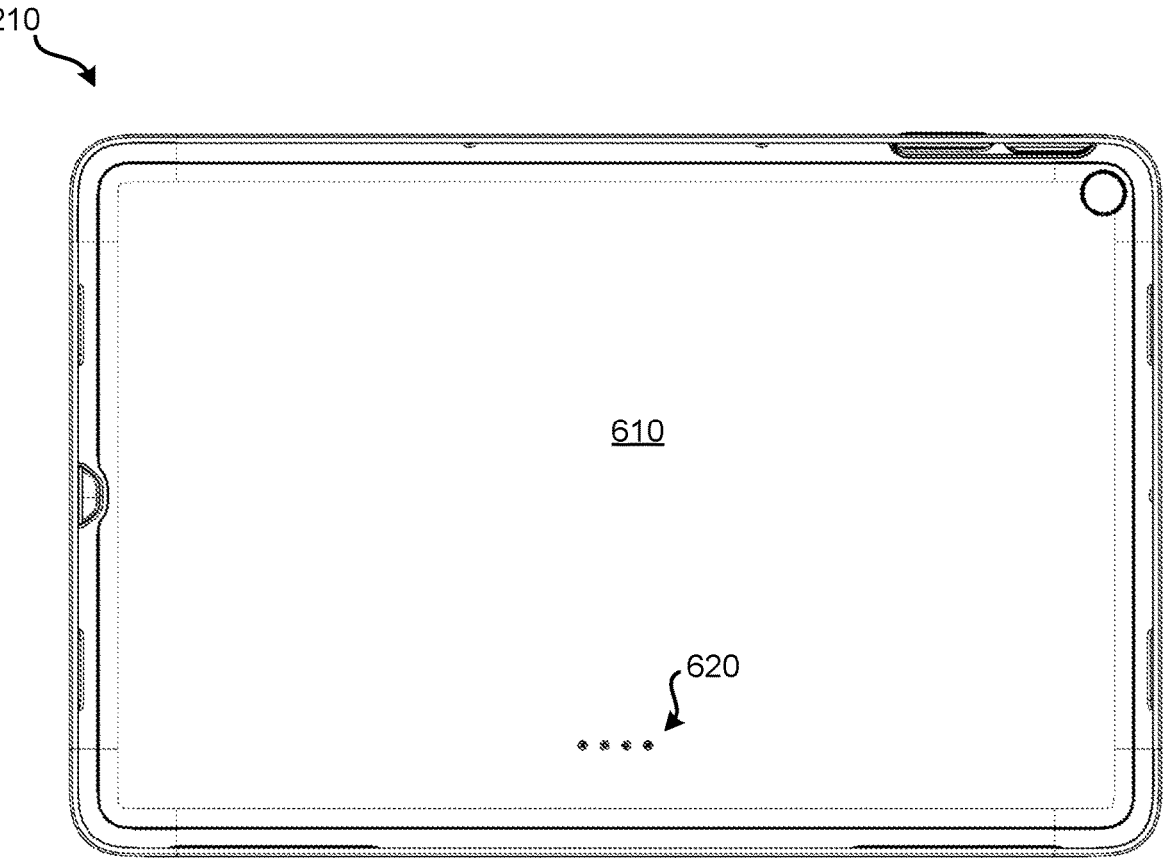
FIG. 6 illustrates a front view of an embodiment of a case.

FIG. 6 illustrates a front view of an embodiment of case 210 without a device installed. When a device is installed, such as device 100, rear surface 110 rests against inner surface 610 of case 210. Pins 620 are positioned to correspond to contact pads 120 of device 100. Therefore, when device 100 is installed in case 210, pins 620 make physical contact with contact pads 120 and transfer electrical signals from contact pads 120 to contact pads 220. While the illustrated embodiments use contact pads on the rear of device 100 and rear surface 217 and pins on inner surface 610, it should be understood that other forms of electrical contacts can be used instead.

In some embodiments, inner surface 610 is a microfiber surface or painted polycarbonate surface. Some materials, such as microfiber, may help prevent scratches to the installed device. Further detail regarding components of case 210 that are not visible in FIG. 6 are provided in relation to FIG. 9.

Figure 7:
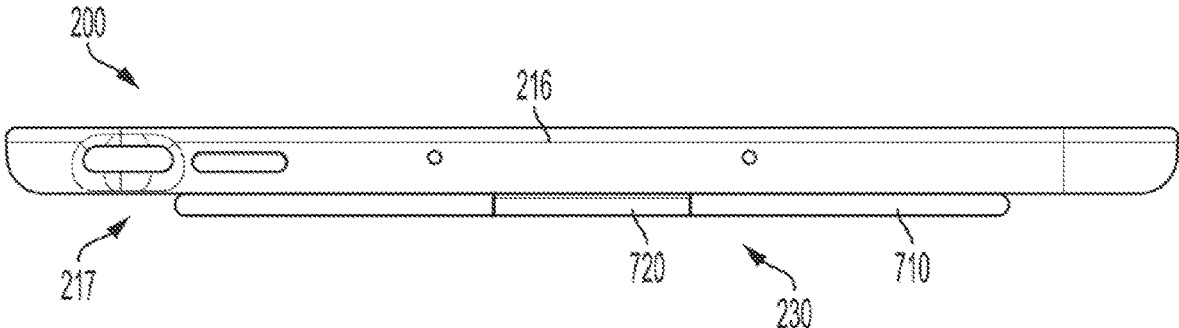
FIG. 7 illustrates a side view of an embodiment of a case.

FIG. 7 illustrates a side view of case 210 as viewed toward top edge 216. Further detail is provided in relation to kickstand assembly 230. Kickstand assembly 230 (kickstand assembly 230 can alternatively be referred to as "kickstand assembly 230") includes kickstand body 710 and hinge barrel 720. Kickstand body 710 may be manually extended and collapsed by a user to a desired position when case 210 is to be propped up when not magnetically coupled with a dock. Hinge barrel 720 serves to connect kickstand body 710 to rear surface 217 of housing 215 of case 210. Hinge barrel 720 helps provide sufficient resistance such that a user can extend and collapse kickstand body 710, but kickstand body 710 does not extend or collapse due to the force of case 210 (and installed device 100) being propped up or under normal use (e.g., a user touching a touchscreen interface of device 100). Further detail regarding the internal components of kickstand assembly 230 is provided in relation to FIG. 9.

Figure 8:
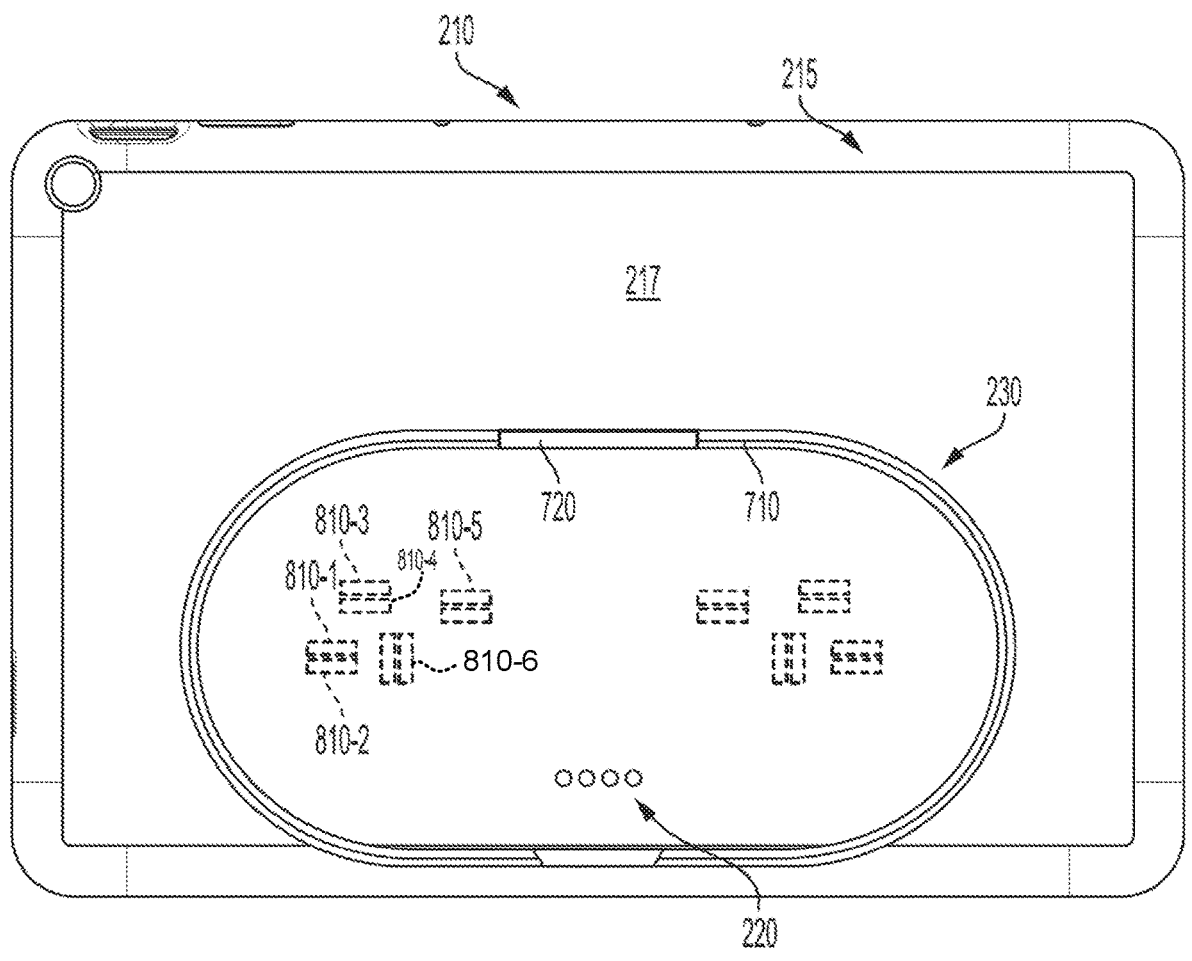
FIG. 8 illustrates a rear view of an embodiment of a case in which the locations of internal magnets are denoted.

FIG. 8 illustrates a rear view of an embodiment of a case in which the locations of internal magnets of case 210 are denoted. In the embodiment of FIG. 8, 22 magnets are present within case 210. In some embodiments, these magnets are arranged in pairs and trios. For simplicity of FIG. 8, the locations of only some magnets are noted: magnets 810-1, 810-2, 810-3, 810-4, 810-5, and 810-6. These magnets may have a polarity such that they magnetically attract both: corresponding magnets in an installed device and corresponding magnets in a dock. Therefore, as an example, a magnet, such as magnet 810-1, can be oriented within case 210 such that a portion of magnet 810-1 nearest inner surface 610 has the opposite polarity as the portion of the corresponding magnet near rear surface 110 of device 100. Similarly, the other portion of magnet 810-1 nearest outer surface 217 of case 210 has the opposite polarity as the portion of the corresponding magnet present near a mating surface of a dock. Such an arrangement can allow the magnets of the device to be attracted to the magnets of the case, which are also attracted to the magnets of the dock.

While in some embodiments magnets 810 are hidden within case 210, in other embodiments, a surface of magnets 810 may be exposed by openings in rear surface 217. In other embodiments, magnets 810 may be installed in one or more recesses of rear surface 217.

The arrangement and numbers of magnets 810 used can vary by embodiment. For example, in this embodiment, case 210 uses 22 magnets. In other embodiments, fewer or a greater number of magnets can be used. While a larger dock, such as dock 310 may couple with all (or most) of the 22 magnets, a relatively smaller dock, such as dock 510, may couple with a smaller subset of the magnets of case 210.

While embodiments detailed herein are focused on using magnets for docking, in other embodiments, a physical protrusion or physical recess in housing 215 can be used to removably attach case 210 with a dock. Such one or more physical protrusions or recesses can be positioned similarly to be encircled by kickstand assembly 230 on rear surface 217.

Figure 9:
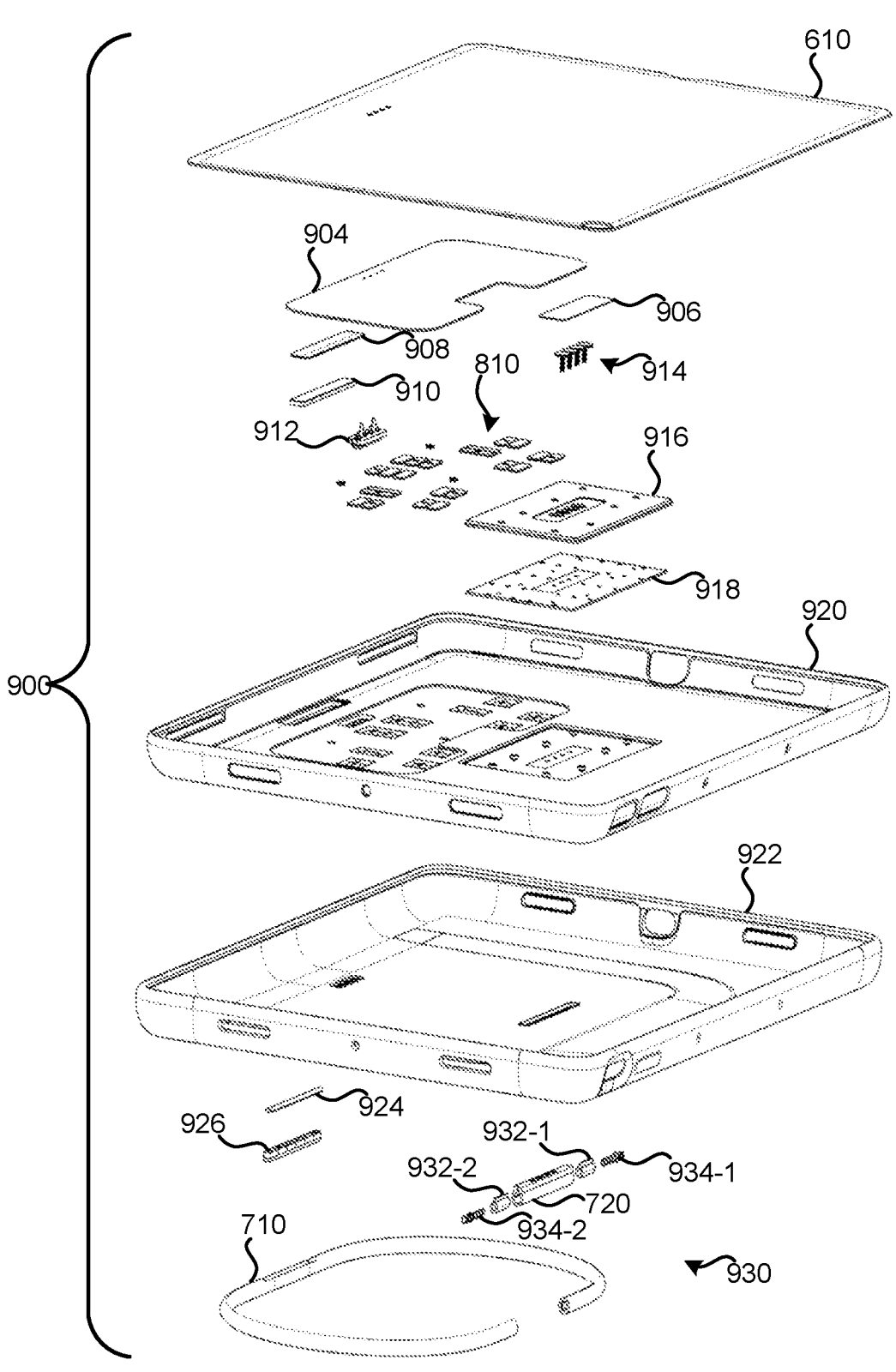
FIG. 9 illustrates an exploded view of an embodiment of a case.

FIG. 9 illustrates an exploded view of an embodiment of case 210. Case 210 can include: inner surface 610; magnet cover 904; screw cover 906; retention magnet cover 908; retention magnets 910; pin block 912; magnets 810; screw 914; hinge plate cover 916; hinge mount plate 918; inner housing 920; outer housing 922; retention magnet 926; retention magnet cover 924; and kickstand assembly 930 (which can include: hinge barrel 720; hinge sleeves 932; hinge shafts 934; and kickstand body 710). Other embodiments can include fewer or a greater number of components.

Inner surface 610 can be made from microfiber, cloth, silicone, or other material that is unlikely to scratch a surface of an installed device. Inner surface 610 rests against a rear surface of the installed device. Inner surface 610 can conceal various components housed by inner housing 920. Inner housing 920 can be polycarbonate or some other semi-rigid material. An edge of inner housing 920 may use friction and/or pressure to keep an installed device in position within case 900. Inner housing 920 and inner surface 610 can house: retention magnets 910, pin block 912, magnets 810, screws 914, and hinge mount plate 918.

Retention magnet 910 may include one or more magnets that attract to retention magnet 926. Retention magnet 910 and retention magnet 926 can serve to magnetically hold kickstand body 710 against a rear surface of outer housing 922. A user can move retention magnet 926 away from retention magnet 910 when kickstand body 710 is to be used to prop up case 900 (and an installed device). Retention magnet cover 908 can serve to hold retention magnet 910 in place and conceal the presence of retention magnet 910 through inner surface 610.

Pin block 912 can include one or more pins, such as spring-loaded pins (e.g., pogo pins) that electrically contact electrical pads or contact on an installed device. Pin block 912 also includes corresponding electrical pads or contacts that make electrical contact with corresponding contacts or pads of a dock, when docked. Therefore, pin block 912 serves as an electrical pass-through between a device and dock for electrical signals which can include data and/or power. In other embodiments, no electrical contacts may be present, or some other form of electrical contact other than pads and pins may be used.

Magnets 810 can serve to magnetically couple with magnets present in a device installed in case 900 and magnetically couple with magnets present in a dock with which case 900 can be docked. A dock may or may not couple with all present magnets 810. Magnet cover 904 can serve to hold magnets 810 in place and conceal the presence of magnets 810 through inner surface 610.

In some embodiments, inner housing 920 may be formed in a two-step process such that an overmold process is performed such that hinge mount plate 918 is effectively within a housing formed by inner housing 920 and hinge plate cover 916, which is formed of the same material as inner housing 920, such as polycarbonate. In other embodiments, hinge mount plate 918 is attached to inner housing 920 and hinge plate cover 916, which is not created as part of an overmold process, conceals the presence of hinge mount plate 918 through inner surface 610. In either embodiment, hinge mount plate 918 serves as a structural base to connect inner housing 920 with kickstand assembly 930 and provide support when kickstand assembly 930 is used to prop up case 900. Screws 914 can serve to fasten hinge plate cover 916 and hinge mount plate 918 with inner housing 920. Screw cover 906 can serve to conceal the presence of screws 914 through inner surface 610. While the illustrated embodiment shows four screws, greater or fewer numbers of screws can be present in other embodiments. Other forms of fastening, such as adhesive, can be used instead of screws 914.

In some embodiments, inner housing 920 and outer housing 922 are formed as a single piece and are made from a single material (e.g., polycarbonate). In other embodiments, inner housing 920 and outer housing 922 are formed from separate materials, then attached together, such as by using an adhesive. Outer housing 922 can be formed from silicone or some other material that is relatively less rigid than inner housing 920. For example, outer housing 922 may help protect an installed device against drops by helping absorb the drop's force, temporarily deforming, and dispersing the force over an area of inner housing 920.

Retention magnet 926, which can include one or more magnets, is housed within kickstand body 710 and magnetically couples with retention magnet 910. Retention magnet 926 is held in place and/or concealed by retention magnet cover 924. Kickstand assembly 930 can include: hinge barrel 720, hinge sleeves 932, and hinge shafts 934. Hinge barrel 720 can physically secure kickstand body 710 with hinge mount plate 918. Hinge sleeves 932 (932-1, 932-2) and hinge shafts 934 (934-1, 934-2) can allow kickstand body 710 to be rotated when sufficient force is applied. The amount of force necessary to cause kickstand body 710 to be rotated can be set based on characteristics of hinge sleeves 932 and hinge shafts 934. Namely, the amount of force may need to be small enough to be convenient to a user but great enough such that kickstand body 710 supports case 900 (and an installed device) when kickstand body 710 is at least partially extended without moving (i.e., extending further or collapsing) and can account for forces applied during normal use, such as a user touching a screen of the installed device.

Figure 10:
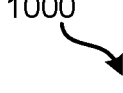
FIG. 10 illustrates an embodiment of a method for using a case for supporting a device and docking with a dock.
Figure 10:
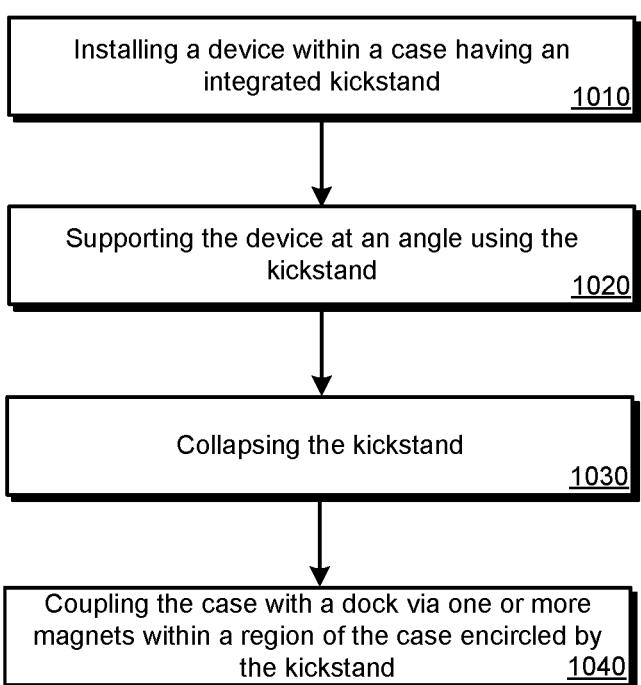

Various methods can be performed using the embodiments of cases detailed in relation to FIGS. 1-9. FIG. 10 illustrates an embodiment of a method 1000 for using a case for supporting a device and docking with a dock. Each block of method 1000 can be performed using any of the embodiments of the case detailed in relation to the previous figures.

At block 1010, a device, such as an electronic device, can be installed within the housing of a case. To do so, the housing may be flexed or deformed slightly to allow the device to be inserted within the housing. The device can then remain installed unless the housing is again flexed or deformed to remove the device. When installed, magnets of the device can magnetically attract and magnetically couple with magnets of the case. At block 1020, a user may extend a kickstand body of the kickstand assembly to an extent desired. The kickstand assembly holds the case and installed device in a propped position. The angle of the kickstand body can be adjusted by the user as desired to adjust the angle at which the case and installed device is propped up.

At block 1030, the kickstand body can be collapsed by the user against or into a rear surface of the case. When collapsed, a retaining magnet of the kickstand assembly can help hold the kickstand body against a rear surface of the case's housing.

After the kickstand has been collapsed, at block 1040, the case can be magnetically docked with a dock using the same magnets (or a subset of the magnets) of the case that are magnetically coupled with the magnets of the device (i.e., the magnets are serially attracted). When docked, the kickstand assembly fully or partially encircles the contact area of the case with the dock.

At some time in the future, a user can remove the case and installed device from the dock and, if desired, return to block 1020. At block 1020, the user can extend the kickstand such that the case and installed device can be supported in a propped-up position using the kickstand.

Figure 11:
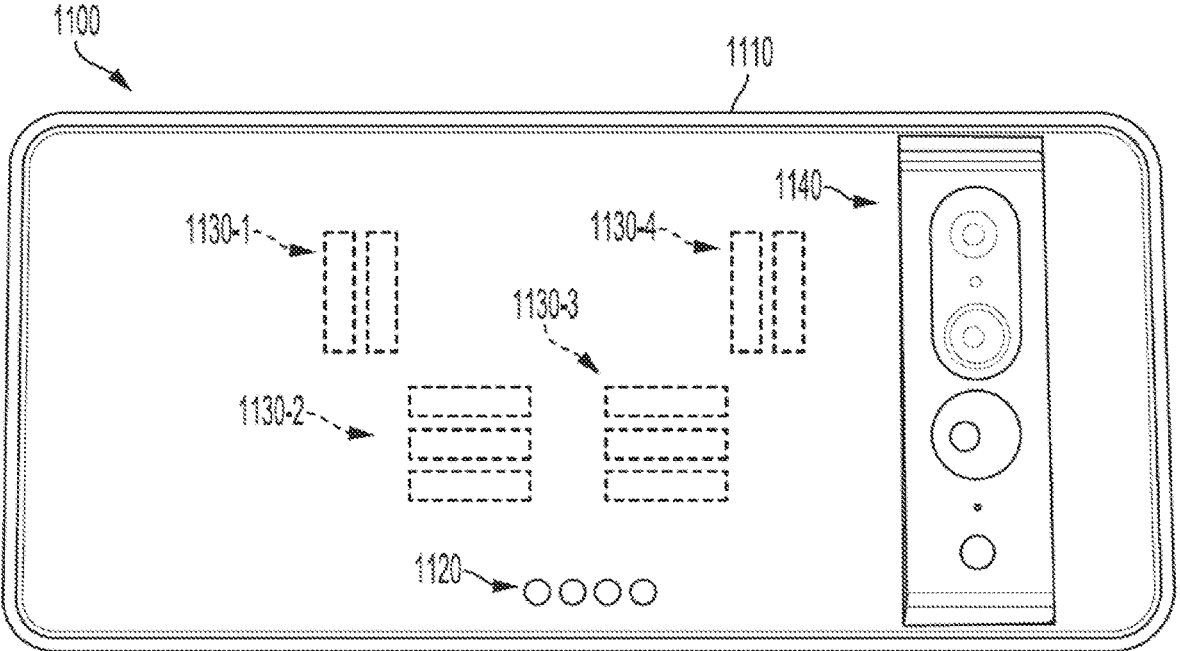
FIG. 11 illustrates an embodiment of a case for a cellular phone.

While the embodiments detailed thus far have focused on cases for tablet computers, the concepts detailed herein can be extended to cellular phones or other electronic devices. FIG. 11 illustrates an embodiment 1100 of a case for a cellular phone. In embodiment 1100, case 1110 is presented that includes magnets 1130 (which includes magnet groups 1130-1, 1130-2, 1130-3, and 1130-4) and electrical contacts 1120. When docked with dock 310, electrical contacts 1120 allow cellular phone to be in communication with dock 310, such as to output audio and receive power. Internally within case 1110, electrical connections to electrical contacts 1120 are routed to appropriate connections of the cellular phone, such via a USB-C connector that inserts into a corresponding USB-C connector of the cellular phone.

Magnets 1130, located within case 1110, magnetically couple with corresponding magnets of dock 310. Embodiments of case 1110 may not have any form of a kickstand; however, it is also possible that some form of kickstand can be incorporated into case 1110. Region 1140 represents a portion of the cellular phone exposed by case 1110. Region 1140 can include one or more camera lens, lights, and/or other sensors. In some embodiments, region 1140 is part of a bezel of the cellular phone. In order to enable the cellular phone when installed in case 1110 to rest flat (e.g., on dock 310), a thickness of case 1110 may be the same, approximately the same, or thicker than the cellular phone bezel.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An electronic device case comprising:
a housing shaped to allow an electronic device to be removably installed within the housing;
a first plurality of magnets housed by the housing, the first plurality of magnets arranged to magnetically couple with a second plurality of magnets of a dock; and
a kickstand assembly attached with the housing, wherein a kickstand body of the kickstand assembly is extendable for propping up the electronic device case when the electronic device case is not docked with the dock and the kickstand body is collapsible to rest against a rear surface of the housing.

2. The electronic device case of claim 1, wherein the kickstand assembly, when the kickstand body is collapsed against the rear surface and the first plurality of magnets are coupled with the second plurality of magnets, the kickstand assembly encircles a mating surface of the dock.

3. The electronic device case of claim 1, wherein the first plurality of magnets is further configured to magnetically couple with a third plurality of magnets of the electronic device.

4. The electronic device case of claim 1, wherein the kickstand assembly is ring-shaped.

5. The electronic device case of claim 4, wherein the kickstand assembly is an elongated fully encircling ring-shaped kickstand.

6. The electronic device case of claim 1, further comprising:

a plurality of electrical contacts, housed by the housing, wherein when the electronic device is installed with the electronic device case and the electronic device case is docked with the dock, the plurality of electrical contacts transfer electrical signals between the dock and the electronic device.

7. The electronic device case of claim 6, wherein the plurality of electrical contacts comprises one or more pogo pins.

8. The electronic device case of claim 1, wherein the housing is formed from an inner housing and an outer housing, the inner housing and the outer housing being made of different materials.

9. The electronic device case of claim 8, wherein an inner surface of the housing is covered in microfiber.

10. The electronic device case of claim 1, wherein a retention magnet is housed by the kickstand body to retain the kickstand body against the rear surface of the housing when the kickstand body is collapsed.

11. The electronic device case of claim 1, wherein the electronic device is a cellular phone.

12. A tablet computer system, comprising:

a tablet computer;

a dock for the tablet computer from which the tablet computer can be removably docked; and a case for the tablet computer, the case comprising:

a housing shaped to allow the tablet computer to be removably installed within the housing;

a first plurality of magnets housed by the housing, the first plurality of magnets arranged to magnetically couple with a second plurality of magnets of the dock; and a kickstand assembly attached with the housing, wherein the case is removably dockable from the dock; and a kickstand body of the kickstand assembly is extendable for propping up the case when the case is not docked with the dock and the kickstand body is collapsible to rest against a rear surface of the housing.

13. The tablet computer system of claim 12, wherein the kickstand assembly, when the kickstand body is collapsed against the rear surface and the first plurality of magnets are coupled with the second plurality of magnets of the dock, the kickstand assembly encircles a mating surface of the dock.

14. The tablet computer system of claim 13, wherein the kickstand assembly is ring-shaped.

15. The tablet computer system of claim 14, wherein the kickstand assembly is an elongated fully encircling ring-shaped kickstand.

16. The tablet computer system of claim 12, further comprising:

a plurality of electrical contacts, housed by the housing, wherein when the electronic device is installed with the electronic device case and the electronic device case is docked with the dock, the plurality of electrical contacts transfer electrical signals between the dock and the electronic device.

17. The tablet computer system of claim 16, wherein the plurality of electrical contacts comprises one or more pogo pins.

18. The tablet computer system of claim 12, wherein the housing is formed from an inner housing and an outer housing, the inner housing and the outer housing being made of different materials.

19. The tablet computer system of claim 12, wherein the first plurality of magnets is further configured to magnetically couple with a third plurality of magnets of the tablet computer while magnetically coupled with the second plurality of magnets of the dock.

20. The tablet computer system of claim 19, wherein a retention magnet is housed by the kickstand body to retain the kickstand body against the rear surface of the housing when the kickstand body is collapsed.

* * * * *